Aug. 6, 1940.  J. W. RUND, JR  2,210,341
CORN HARVESTER
Filed Aug. 23, 1939
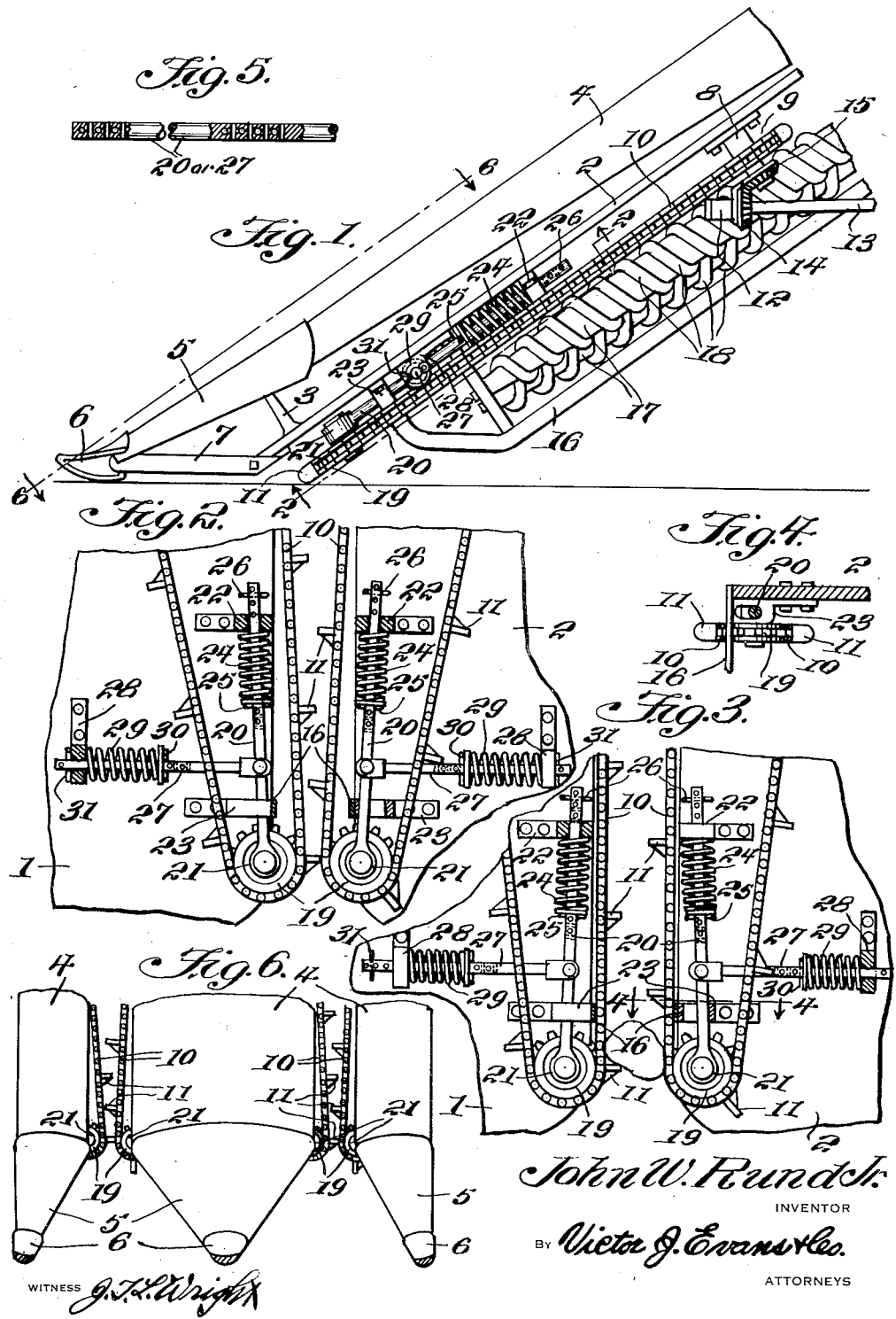

Patented Aug. 6, 1940

2,210,341

UNITED STATES PATENT OFFICE 2,210,341

CORN HARVESTER

John W. Rund, Jr., Pesotum, Ill.

Application August 23, 1939, Serial No. 291,583

4 Claims. (Cl. 56—104)

This invention relates to corn harvesters, and its general object is to provide a gathering and picking unit therefor, that is not only capable of completely stripping fixed stalks of corn or the like, whether or not they are standing, leaning or bent, but also is capable of gathering loose ears and broken stalks from the ground, and such is brought about by the use of ground engaging shoes at the forward ends of tapered stalk guides and the disposal of the lower sprockets of companion gathering chains in substantially ground engaging position and in close proximity to each other, for the chains to grip the loose ears and carry them to the elevator of the harvester.

Another object is to provide a gathering and picking unit for a corn harvester and the like, that includes yieldable mounting means for the lower gathering chain sprockets to allow them to be separated, to not only prevent the chains from crushing the ears that have been picked up from the ground, but also to prevent breaking of the parts in the event a stone or other foreign object is picked up, or the sprockets contact an obstruction.

A further object is to provide a gathering and picking unit for a corn harvester and the like, that is simple in construction, inexpensive to manufacture, can be installed on harvesters now in use, and is extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the unit which forms the subject matter of the present invention.

Figure 2 is a sectional view taken approximately on line 2—2 of Figure 1, looking in the direction of the arrows.

Figure 3 is a view similar to Figure 2, but illustrates the position assumed by the parts when a stone is picked up.

Figure 4 is a sectional view taken approximately on line 4—4 of Figure 3, looking in the direction of the arrows.

Figure 5 is a fragmentary detail view with parts in section of one of the sprocket mounting levers or arms.

Figure 6 is a sectional view taken approximately on line 6—6 of Figure 1, looking in the direction of the arrows.

Referring to the drawing in detail, it will be noted that I have illustrated my unit in the form of a two row picker, but it will be understood that it can be constructed for one or more rows.

The form shown includes an intermediate platform 1 and outer platforms 2 disposed parallel with the intermediate platform and spaced in longitudinal edge to edge relation, to provide passageways between the respective platforms for the stalks. The platforms are suitably secured to the body frame of the harvester for disposal at an inclination in the usual manner, and act as main supporting means for the gathering and picking unit, as will be apparent upon inspection of Figure 1.

Secured to and rising from the platforms are uprights 3 for supporting the lower end portions of shield housings 4 that are rounded transversely in the usual manner, and terminate at their outer ends in tapered stalk guides 5, the latter having secured to the outer ends thereof shoes 6 having arcuate ground engaging portions, and brace strips 7 extend between the guides 5 and the lower ends of the platforms, as clearly shown in Figure 1, from which it will be noted that the brace strips are arranged in close proximity to the ground.

Fixed to and depending from the underside of the platforms are bearing brackets 8 having journaled therein, stub shafts for the upper sprockets 9 of gathering chains 10, there being two pairs of chains in the form shown, one pair for each passageway, with the adjacent runs of the chains disposed to travel below and longitudinally of the passageways, as best shown in Figures 2 and 3, and fixed to the chains are stalk engaging fingers or lugs 11, arranged thereon in a manner so that the lugs of the inner run of a companion chain will be disposed midway between the lugs of the inner run of the other companion chain, to prevent any possibility of the lugs damaging ears of corn, as will be apparent. Mounted in suitably supported bearing brackets 12 are drive shafts 13 having gears 14 thereon and which mesh with gears 15 on the stub shafts 8, for rotating the sprockets 9.

The platforms likewise have secured to the undersides thereof frames 16 for supporting pairs of companion snapping rollers 17 that are mounted in suitable bearings on the frame and the rolls are provided with spirally arranged ribs 18 for snapping the ears from the stalks in the usual manner, as well as for delivering the ears to an elevator not shown, but is disposed at the upper ends of the rolls.

The most important feature of my unit lies in the fact that the lower sprockets 19 for companion gathering chains are yieldably supported in close proximity to the ground as well as in close proximity to each other for normally positioning the lower ends of the chains accordingly, as clearly shown in Figure 2. The yieldable supporting means for the sprockets 19 include rod like leavers 20 extending longitudinally of the platforms, with bearings 21 mounted in the lower ends thereof for the sprockets 19, and the upper portions of the rod like levers are swingingly mounted in bearing brackets 22 secured to the platform, the bearing faces of the brackets 22 being rounded to allow the levers to swing, as will be apparent upon inspection of Figures 2 and 3, while the lower portions of the levers 20 are mounted in keeper guide brackets 23 secured to the platform and to limit the swinging movement.

Sleeved on the levers 20 are coil springs 24 engaged with the brackets 22, and cotter pins 25 that extend through the levers between the brackets 22 and 23. Cotter pins 26 are provided at the upper ends of the levers, and both the pins 25 and 26 are received in any one of a number of bores transversing the levers, as best shown in Figure 5. By the use of the spring pressed levers, it will be obvious that the sprockets 19 hold the lower ends of the chains in substantially ground engaging position, as shown in Figure 1, so that the chains are capable of picking up loose ears of corn and broken stalks, but should the chains or lugs 11 come in contact with an obstruction, the sprockets will give and thereby prevent breakage of the parts, as will be apparent.

Pivotally secured to the levers 20 between the brackets 22 and 23 and extending laterally therefrom are arms 27 that have their outer end portions swingingly mounted in bearing brackets 28 secured to the platform and the bearings of the brackets 28 like those of the brackets 22 have rounded faces to allow for the swinging movement of the arms 27, and sleeved on the arms are coil springs 29 engaged with the brackets 28 and cotter pins 30 for normally holding the sprockets 19 in their innermost position, as shown in Figure 2, so that the chains will grip the loose ears and carry them to the snapping rolls 17 for the latter to convey the same to the elevator previously mentioned. The spring pressed arms not only prevent the chains from crushing the ears, but in the event the chains or lugs should pick up a stone, as shown in Figure 3, the arms will allow the sprockets to give laterally away from each other and thereby prevent breakage of the parts. Cotter pins 31 are provided for the outer ends of the arms 27 to limit the movement thereof, and the pins 30 and 31 are receivable in any one of a number of bores transversing the arms for adjusting the pressure of the springs and the movement of the arms.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A gathering and picking unit for corn harvesters and the like, comprising inclined supporting means spaced from each other to provide stalk receiving passageways, companion gathering chains paralleling the passageways and having their adjacent runs disposed in a plane below the passageways, upper and lower sprockets for the chains, fixed mounting means for the upper sprockets, yieldable means carrying the lower companion sprockets, means having the yieldable means mounted therein for slidable and swinging movement and being shaped and secured to the supporting means in a manner to allow movement of the lower sprockets longitudinally and laterally of the passageways, transversely rounded shield housings overlying the supporting means and mounting means, tapered means at the lower ends of the housings for guiding the stalks to the passageways for disposal between the chains, shoes secured to the outer ends of the guiding means and including arcuate ground engaging portions, and snapping rolls arranged in pairs below the companion gathering chains.

2. A gathering and picking unit for corn harvesters and the like, comprising inclined supporting means spaced from each other to provide stalk receiving passageways, companion gathering chains paralleling the passageways, upper and lower sprockets for the chains, fixed mounting means for the upper sprockets, swingingly mounted spring pressed levers extending longitudinally of the passageways and carrying the lower sprockets for normally holding the lower ends of the runs of companion chains in close proximity to the ground, and swingingly mounted spring pressed arms pivotally secured to the levers and extending outwardly and laterally therefrom for normally holding the lower ends of said runs in close proximity to each other.

3. A gathering and picking unit for corn harvesters and the like comprising inclined supporting means spaced from each other to provide stalk receiving passageways, companion gathering chains paralleling the passageways, upper and lower sprockets for the chains, fixed mounting means for the upper sprockets, spring pressed levers carrying the lower sprockets and normally holding the lower ends of the runs of companion chains in close proximity to the ground, brackets including bearings for the levers and secured to the supporting means for disposing the levers lengthwise of the passageways, said bearings being shaped to allow swinging movement of the levers, spring pressed arms pivotally secured to the levers for normally holding the lower ends of said runs in close proximity to each other, brackets including bearings for the arms and secured to the supporting means for disposing the arms laterally of the levers and the latter bearings being shaped to provide swinging movement of the arms.

4. A gathering and picking unit for corn harvesters and the like comprising inclined supporting means spaced from each other to provide stalk receiving passageways, companion gathering chains paralleling the passageways, upper and lower sprockets for the chains, fixed mounting means for the upper sprockets, adjustable spring pressed levers carrying the lower sprockets and urging and holding the lower ends of the runs of companion chains in close proximity to the ground, adjustable spring pressed arms pivotally secured to the levers and extending outwardly and laterally therefrom for urging and holding the lower ends of said runs in close proximity to each other, and shield housings overlying the supporting means and the arms and levers, tapered means at the lower ends of the shield housings for guiding stalks to the passageways for disposal between the chains, shoes secured to the outer ends of the guiding means and including arcuate ground engaging portions, frame means secured to the supporting means for disposal below the same, and snapping rolls arranged in pairs and journaled in the frame means to underlie the passageways.

JOHN W. RUND, Jr.